US010634781B2

(12) United States Patent
Heath et al.

(10) Patent No.: US 10,634,781 B2
(45) Date of Patent: Apr. 28, 2020

(54) DETERMINING DISTANCE TO A TARGET OBJECT UTILIZING WIRELESS DEVICES OPERATING AS RADAR DEVICES

(71) Applicant: Board of Regents, The University of Texas System, Austin, TX (US)

(72) Inventors: Robert Heath, Austin, TX (US); Robert Daniels, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 439 days.

(21) Appl. No.: 15/416,698

(22) Filed: Jan. 26, 2017

(65) Prior Publication Data

US 2017/0212234 A1    Jul. 27, 2017

Related U.S. Application Data

(60) Provisional application No. 62/287,509, filed on Jan. 27, 2016.

(51) Int. Cl.
*G01S 13/93* (2020.01)
*G01S 13/931* (2020.01)
(Continued)

(52) U.S. Cl.
CPC ............ *G01S 13/931* (2013.01); *G01S 13/08* (2013.01); *G01S 2013/9321* (2013.01); *G08G 1/161* (2013.01)

(58) Field of Classification Search
CPC ...................................................... G01S 13/08
See application file for complete search history.

(56) References Cited

U.S. PATENT DOCUMENTS 6,097,331 A * 8/2000 Matsugatani ............. G01S 7/35
342/109
9,008,958 B2    4/2015 Rubin et al.
(Continued)

OTHER PUBLICATIONS

Proposal to the National Science Foundation STTR Phase I, Jun. 18, 2015, pp. 1-43.
(Continued)

*Primary Examiner* — Marcus E Windrich
(74) *Attorney, Agent, or Firm* — Robert A. Voigt, Jr.; Winstead PC

(57) ABSTRACT

A method, system and computer program product for computing a target distance estimate using a wireless device. A waveform is transmitted to an object (e.g., automobile) by a wireless device. Reflections of the waveform are then received, such as on two forward directional antennas. A channel impulse response (e.g., a frequency-domain channel impulse response) is then obtained from the reflections. A parameterized function is applied to the channel impulse response. Parameters of the parameterized function are fitted to measure the channel impulse response. A distance to the object is then estimated based on the fitted parameters. In this manner, by operating wireless devices as radar devices, a higher accuracy in target range estimates can be achieved with less spectrum bandwidth when compared to standard radar waveforms with standard radar processing. Furthermore, by utilizing wireless devices as opposed to radar devices, the cost problem associated with radar is addressed.

30 Claims, 9 Drawing Sheets

(51) Int. Cl.
*G01S 13/08* (2006.01)
*G08G 1/16* (2006.01)

(56) References Cited

U.S. PATENT DOCUMENTS

| | | | | |
|---|---|---|---|---|
| 2003/0030583 | A1* | 2/2003 | Finn | B60R 21/013 342/70 |
| 2009/0228172 | A1* | 9/2009 | Markyvech | G01S 5/0072 701/36 |
| 2011/0110442 | A1* | 5/2011 | Wu | H04L 5/0048 375/260 |
| 2013/0070869 | A1 | 3/2013 | Motamed et al. | |
| 2013/0342368 | A1* | 12/2013 | Nathanson | G07C 5/008 340/903 |
| 2014/0068088 | A1* | 3/2014 | Krishnan | H04L 61/2038 709/227 |
| 2014/0111209 | A1* | 4/2014 | Gao | G01V 3/26 324/332 |
| 2015/0256972 | A1 | 9/2015 | Markhovsky et al. | |
| 2016/0259041 | A1* | 9/2016 | Tan | G01S 13/003 |

OTHER PUBLICATIONS

Daniels et al., "Cost-Effective Vehicular RADAR Through Minimally-Modified IEEE 802.11 Devices," 2015 IEEE 6th International Workshop on Computational Advances in Multi-Sensor Adaptive Processing (CAMSAP), Cancun, Mexico, Dec. 13-16, 2015, pp. 1-4.

Casey Williams, "Wi-Fi on Lookout for Auto Accidents," http://articles.chicagotribune.com/2012-11-17/classified/sc-cons-1115-autotips-automotive-wifi-20121117_1_wi-fi-roadside-sensors-vehicles, Nov. 17, 2012, pp. 1-4.

Bob Yirka, "GM Working on Wi-Fi Direct Application to Prevent Vehicle/Pedestrian Accidents," http://phys.org/news/2012-07-gm-wi-fi-application-vehiclepedestrian-accidents.html, Jul. 27, 2012, pp. 1-3.

Tuan Nguyen, "Smart Car WiFi System can Prevent Car Accidents," http://www.zdnet.com/article/smart-car-wifi-system-can-prevent-car-accidents, Jan. 28, 2011, pp. 1-9.

Raul Quijada, "Joint Radar and Communication Application for Traffic Safety System," Master's Degree Project, KTH Electrical Engineering, Stockholm, Sweden, Apr. 2011, pp. 1-72.

Kevin Chetty, "WiFi Passive Radar," Department of Security and Crime Science, University College London, Feb. 25, 2015, pp. 1-58.

Wang et al., "Vehicle-to-Vehicle Channel Modeling and Measurements: Recent Advances and Future Challenges," IEEE Communications Magazine, Nov. 2009, pp. 96-103.

Mecklenbrauker et al., "Vehicular Channel Characterization and Its Implications for Wireless System Design and Performance," Proceedings of the IEEE, vol. 99, Issue 7, Jul. 2011, pp. 1189-1212.

Rohling et al., "Waveform Design Principles for Automotive Radar Systems," CIE International Conference on Radar, Oct. 15-18, 2001, pp. 1-4.

Falcone et al., "Experimental Results for OFDM WiFi-Based Passive Bistatic Radar," Radar Conference, May 10-14, 2010, pp. 1-6.

Bajwa et al., "Identification of Parametric Underspread Linear Systems and Super-Resolution Radar," IEEE Transactions on Signal Processing, vol. 59, Issue 6, Jun. 2011, pp. 2548-2561.

Lashkari et al., "Wifi-Based Indoor Positioning System," Second International Conference on Computer and Network Technology, Apr. 23-25, 2010, pp. 76-78.

Fadel Adib, "See Through Walls with Wi-Fi," Submitted to the Department of Electrical Engineering and Computer Science in partial fulfillment of the requirements for the degree of Master of Science in Computer Science and Engineering at the Massachusetts Institute of Technology, Jun. 2013, pp. 1-64.

Letzepis et al., "Joint Estimation of Multipath Parameters from OFDM Signals in Mobile Channels," Communications Theory Workshops, Jan. 31-Feb. 3, 2011, See Abstract.

\* cited by examiner

| Simulation Parameter | Value(s) |
|---|---|
| Physical Layer | IEEE 802.11a/g/p |
| Center Frequency | 5.89 GHz |
| Spectrum Bandwidth (BW) | {10, 20} MHz |
| PHY Sample Rate ($f_s$) | 4× BW |
| Channel Sample Rate ($f_s$) | 100× BW |
| Spectral Mask | IEEE 802.11p |
| Target 1 Range ($r$) | {5, 10, ..., 50} m |
| Target 2 Range ($r$) | 25 m |
| $S_A$ | {−1, −0.5, 0, 0.5, 1} |
| $S_C$ | {0, π/16, ..., 15π/16} |
| $p$ | {5, 6, ..., 50} m |
| Channel Model | Radar Range Equation |
| RCS ($\sigma$) | {0.01, 0.10, 1.00} m² |
| Noise Figure | 5 dB |
| $\epsilon_t$ | 25 |
| Path Phase | ~ Uniform |
| Thermal Noise | ~ Complex Gaussian |
| Monte Carlo Iterations | 5000 |
| Transmit Power | 20 dBm |
| Direct Path Range | 0.1 m |
| $G_1^{(TX)}, G_1^{(RX)}$ | 0 dBi |
| $G_2^{(TX)}, G_2^{(RX)}$ | 15 dBi |
| $F$ | −70 dB |
| Channel Estimation | Least Squares on LTF |

TABLE I

FIG. 8

DETERMINING DISTANCE TO A TARGET OBJECT UTILIZING WIRELESS DEVICES OPERATING AS RADAR DEVICES

TECHNICAL FIELD

The present invention relates generally to radio detection and ranging, and more particularly to determining distance to a target object (e.g., pedestrian, automobile) utilizing wireless devices (e.g., IEEE 802.11 devices) operating as radio detection and ranging (radar) devices.

BACKGROUND

Radar is an object-detection system that uses radio waves to determine the range, angle, or velocity of objects. It can be used to detect aircraft, ships, spacecraft, guided missiles, motor vehicles, weather formations, and terrain. A radar transmits radio waves or microwaves that reflect from any object in their path. A receive radar, which is typically the same system as the transmit radar, receives and processes these reflected waves to determine properties of the object(s).

Currently, radar is being implemented in vehicles (automobiles), where vehicular radar signals may be used to detect forward/reverse object collisions as well as used for adaptive cruise control. Object collisions are detected by determining the distance the vehicle is from the object. For example, one way to obtain a distance measurement to the object is based on the time-of-flight: transmit a short pulse of radio signal (electromagnetic radiation) and measure the time it takes for the reflection to return. The distance is one-half the product of the round trip time (because the signal has to travel to the target and then back to the receiver) and the speed of the signal. Since radio waves travel at the speed of light, accurate distance measurement requires high-performance electronics.

Unfortunately, vehicular radar devices are costly to manufacture with tightly-coupled analog circuits and advanced antenna configurations on expensive process technology. Furthermore, radar is spectrally inefficient. In the standard radar processing architecture, for example, with frequency-modulated continuous-wave (FMCW) radar, the resolution is limited by the distance between the received digital samples. As a result, the spectrum bandwidth needs to be 150 MHz for meter-level accuracy. Additionally, current radar has no standardized capacity and/or smart coexistence, which are fundamental to communication systems. Finally, radar is insecure in that such devices are susceptive to spoofing since they do not accompany a fully-capable communication system to verify electromagnetic signal integrity. As a result, emergency braking and adaptive cruise control systems can be disrupted.

Hence, current vehicular radar systems are expensive to implement with spectrum inefficiency, lack of multiple access and minimal security.

SUMMARY

In one embodiment of the present invention, a method for computing a target distance estimate using a wireless device comprises transmitting a waveform to an object by a wireless device, where the waveform is a wireless communication signal. The method further comprises receiving reflections of the waveform. The method additionally comprises obtaining a channel impulse response from the reflections. Furthermore, the method comprises applying, by a processor, a parameterized function to the channel impulse response. Additionally, the method comprises fitting parameters of the parameterized function, by the processor, to measure the channel impulse response. In addition, the method comprises estimating, by the processor, a distance to the object based on the fitted parameters.

Other forms of the embodiment of the method described above are in a system and in a computer program product.

In another embodiment of the present invention, a system comprises a wireless device and a transmit antenna connected to the wireless device, where the wireless device is configured to transmit a wireless communication signal to an object via the transmit antenna. The system further comprises a receive antenna connected to the wireless device, where the receive antenna is configured to receive reflections of the wireless communication signal. Furthermore, the system comprises a controllable attenuator connected to ports of the transmit and receive antennas, where the controllable attenuator is adapted to control resolution of the reflections of the wireless communication signal.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 8 is a table, Table 1, of the simulation parameters to test the ranging feasibility in accordance with an embodiment of the present invention;

DETAILED DESCRIPTION

While the following discusses the present invention in connection with estimating distances to targets (e.g., pedestrians, automobiles) utilizing wireless devices (e.g., IEEE 802.11 devices) operating as radio detection and ranging (radar) devices for automobile applications, the principles of the present invention may also be applied to other applications, such as gesture recognition and user interaction devices (e.g., replace peripheral devices, such as the mouse). A person of ordinary skill in the art would be capable of applying the principles of the present invention to such implementations. Further, embodiments applying the principles of the present invention to such implementations would fall within the scope of the present invention.

Furthermore, while the following discusses the present invention in connection with estimating a distance to a single target, the principles of the present invention may be applied to estimating the distance to multiple targets. A person of ordinary skill in the art would be capable of applying the principles of the present invention to such implementations. Further, embodiments applying the principles of the present invention to such implementations would fall within the scope of the present invention.

Figure 1:
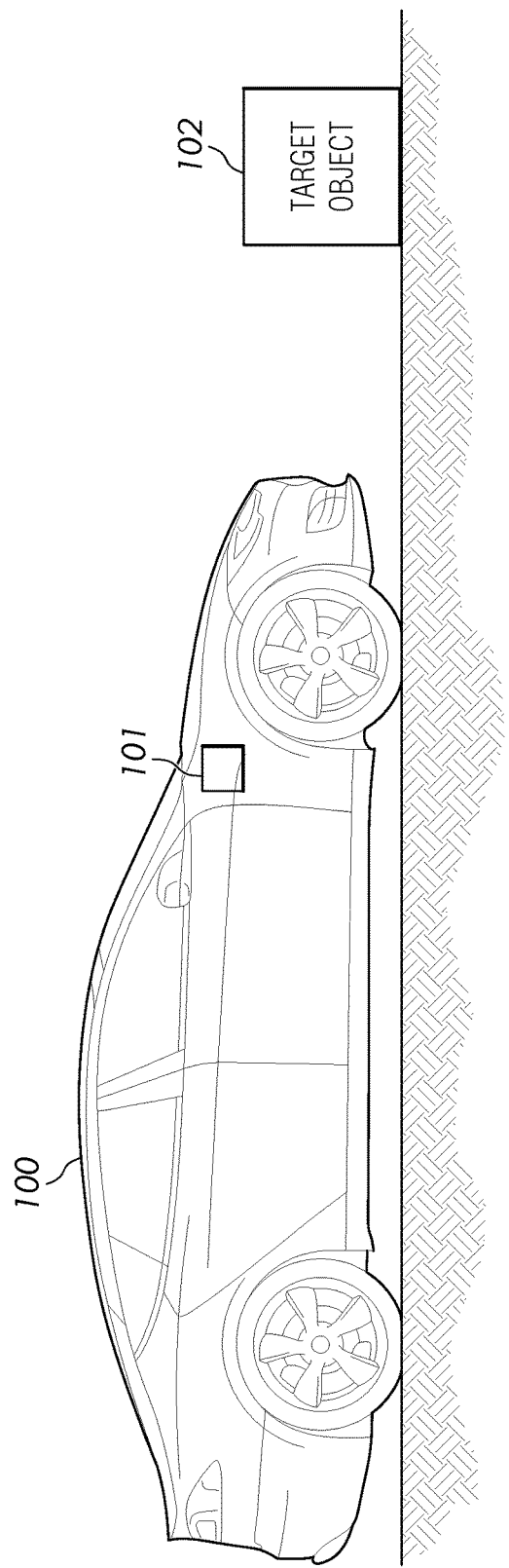
FIG. 1 illustrates a vehicle with an object collision detection system according to one embodiment of the present invention.

Referring now to the Figures in detail, FIG. 1 illustrates a vehicle 100 with an object collision detection system 101 according to one embodiment of the present invention. Object collision detection system 101 is configured to estimate the distance from vehicle 100 to a target object 102, such as a pedestrian or another vehicle. A hardware configuration of an object collision detection system 101 is discussed below in connection with FIG. 2.

Figure 2:
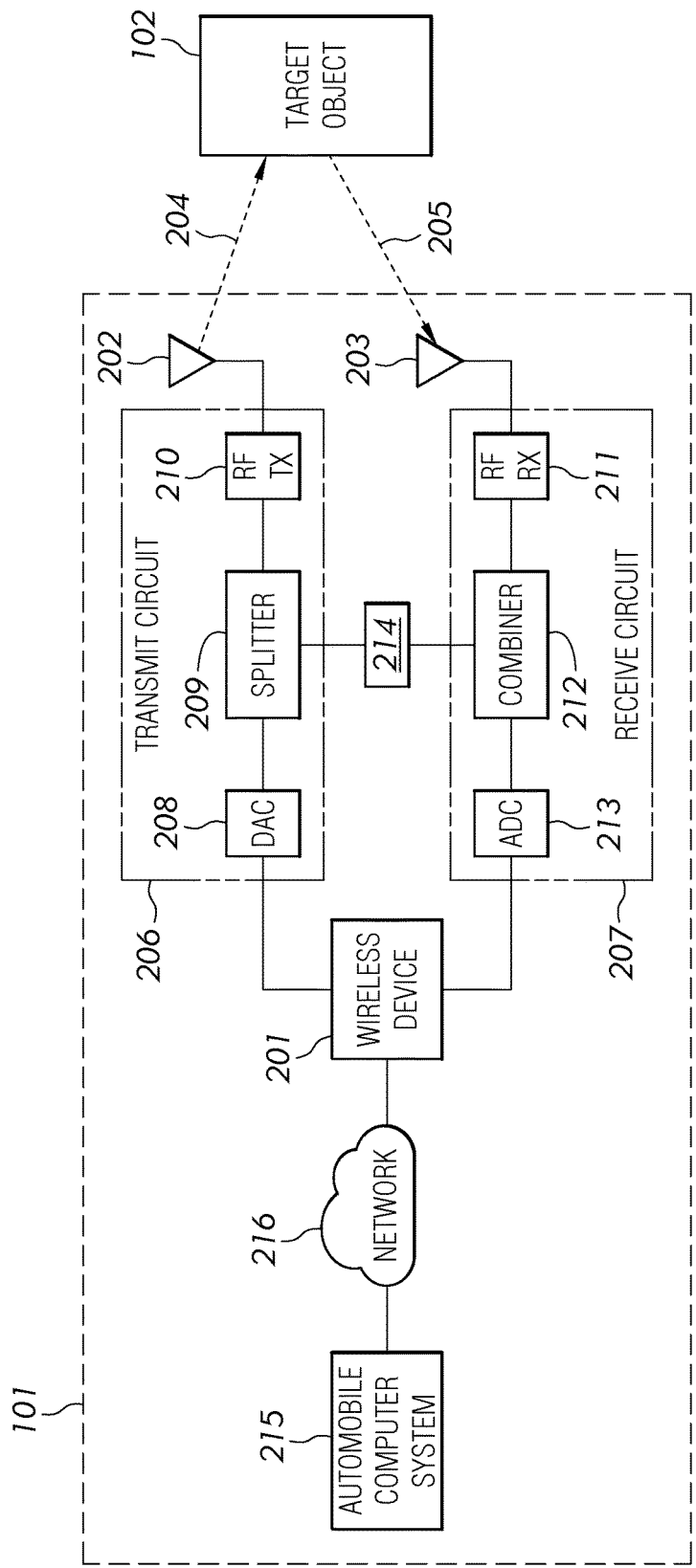
FIG. 2 illustrates an embodiment of the present invention of the object collision detection system.

FIG. 2 illustrates an embodiment of the present invention of object collision detection system 101 (FIG. 1). Referring to FIG. 2, object collision detection system 101 includes a wireless device 201 (e.g., IEEE 802.11 device) connected to a transmit antenna 202 and a receive antenna 203. Wireless device 201 is configured to implement wireless communications, such as via the IEEE 802.11 protocol. As will be discussed in further detail below, in one embodiment, the distance from vehicle 100 to target object 102 will be estimated based on a waveform 204 transmitted by wireless device 201 via transmit antenna 202 to target object 102 and the reflections 205 received by receive antenna 203. It is noted that while FIG. 2 illustrates a single transmit antenna 202 and a single receive antenna 203 that object collision detection system 101 may include multiple transmit and/or receive antennas 202, 203, respectively. For example, object collision detection system 101 may include multiple receive antennas 203 to receive the reflections 205 of waveform 204. Furthermore, in one embodiment, object collision detection system 101 may utilize a single antenna system which connects to both transmit and receive RF circuits.

FIG. 2 further illustrates a transmit circuit 206 connected to wireless device 201, where data transmitted from wireless device 201 is converted to an analog signal via digital-to-analog converter (DAC) 208, which is split into various waveforms (e.g., waveform 204) by splitter 209. In one embodiment, waveform 204 is transmitted to target object 102 by radio frequency transmitter 210 (identified as "RF TX" in FIG. 2) transmitting waveform 204 through transmit antenna 202.

Furthermore, FIG. 2 illustrates a receive circuit 207 connected to wireless device 201, where analog signals (e.g., reflected waveforms 205) received from receive antenna 203 are received by radio frequency receiver 211 (identified as "RF RX" in FIG. 2) and combined by combiner 212. The combined reflections are then converted to digital data via analog-to-digital converter (ADC) 213.

In one embodiment, in order to provide a zero-distance reference and to improve the resolution of the reflections 205, a controllable attenuator 214 is connected directly or indirectly (as shown in FIG. 2) to the ports of transmit and receive antennas 202, 203. While FIG. 2 illustrates attenuator 214 as not being directly connected to the ports of transmit and receive antennas 202, 203, in other embodiments, attenuator 214 may be directed connected to the ports of transmit and receive antenna 202, 203.

In one embodiment, as will be discussed in further detail below, the channel impulse response may be obtained from reflections 205. The channel impulse response may also be obtained from reflections 205 and/or an "internal waveform" that is communicated between the transmit and receive circuits 206, 207. This "internal waveform," as used herein, refers to the same waveform that is transmitted to target object 102, but instead, is directly communicated internally, such as between transmit and receive circuits 206, 207. That is, in one embodiment, wireless device 201 transmits a waveform that is transmitted to target object 102 via transmit antenna 202 and may also transmit the same waveform internally, such as between transmit circuit 206 and receive circuit 207.

In one embodiment, the attenuation setting for controllable attenuator 214 is adapted to control the resolution of the reflections 205 of waveform 204. For example, in one embodiment, attenuator 214 is set to its maximum attenuation value in order to ensure that attenuator 214 detects the signal strength of the reflections 205 of waveform 204. After detecting the signal strength of the reflections 205 of waveform 204 (i.e., after wireless device 201 transmits waveform 204 and receives the reflections 205 of waveform 204), the attenuation of attenuator 214 is set such that the "internal waveform" received through attenuator 214 is stronger (e.g., 10 dB stronger) than reflected waveform 205.

As further illustrated in FIG. 2, object collision detection system 101 includes an automobile computer system 215 connected to wireless device 201 via a network 216 to perform radar processing and to estimate the distance to target object 102 using the principles of the present invention as discussed further below. In one embodiment, such radar processing and estimating the distance to target object 102 may be performed by wireless device 201.

Network 216 may be, for example, a wireless local area network, a WiFi network, an IEEE 802.11 standards network, various combinations thereof, etc. Other networks, whose descriptions are omitted here for brevity, may also be used in conjunction with system 101 of FIG. 2 without departing from the scope of the present invention. A hardware configuration of automobile computer system 215 is provided below in connection with FIG. 3.

Figure 3:
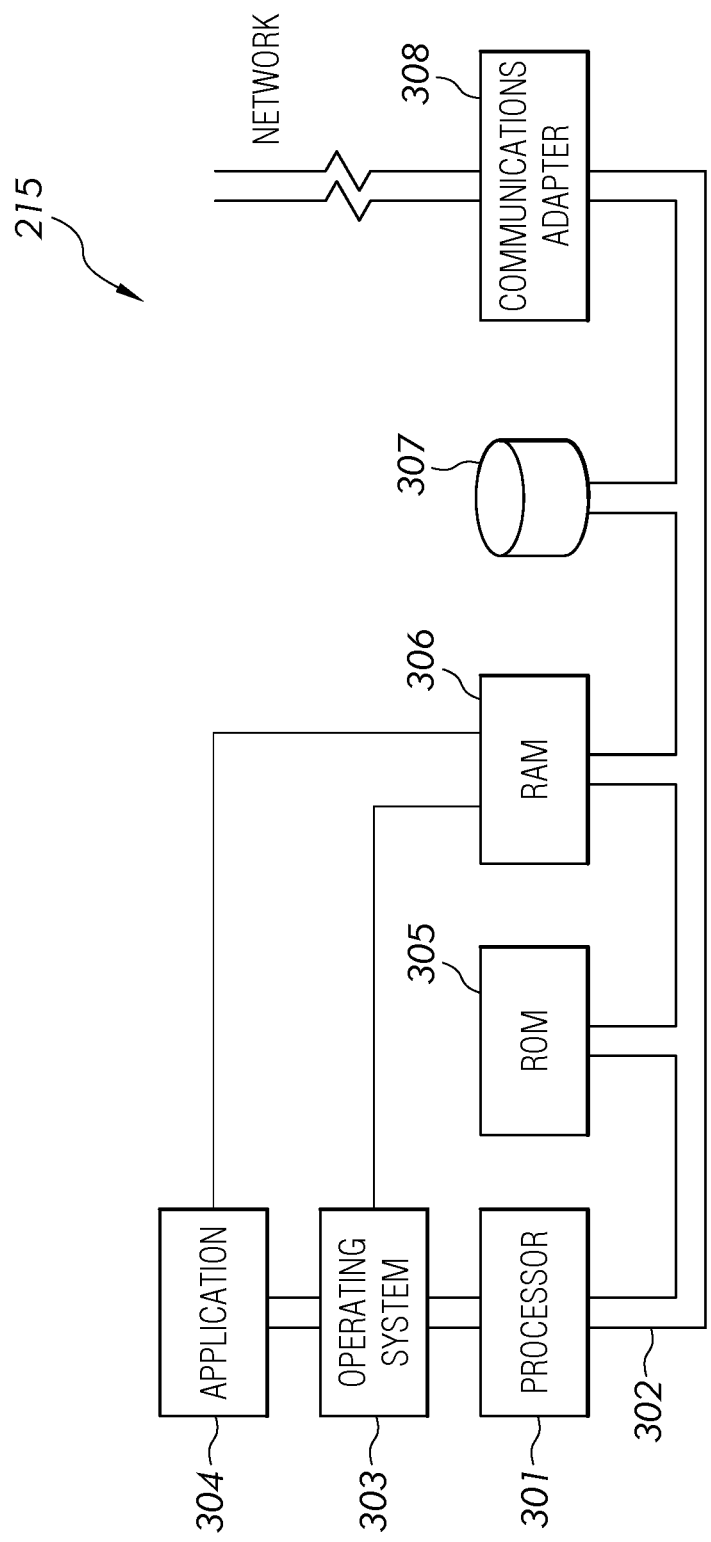
FIG. 3 illustrates a hardware configuration of an automobile computer system configured in accordance with an embodiment of the present invention.

Referring now to FIG. 3, FIG. 3 illustrates a hardware configuration of automobile computer system 215 (FIG. 2)

which is representative of a hardware environment for practicing the present invention. Referring to FIG. 3, automobile computer system 215 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for estimating a distance to target object 102 (FIGS. 1 and 2) from vehicle 100 (FIG. 1) using wireless device 201 as a radar device as discussed further below in connection with FIGS. 4-9, 10A-10B and 11. Application 304 may also include target tracking loops which recognize new targets, update information on existing targets, and combine data from other sensors (e.g., ultrasonic sensors, cameras, light detection and ranging sensors, and other radars).

Referring again to FIG. 3, read-only memory ("ROM") 305 is coupled to system bus 302 and includes a basic input/output system ("BIOS") that controls certain basic functions of automobile computer system 215. Random access memory ("RAM") 306 and disk adapter 307 are also coupled to system bus 302. It should be noted that software components including operating system 303 and application 304 may be loaded into RAM 306, which may be automobile computer system's 207 main memory for execution. Disk adapter 307 may be an integrated drive electronics ("IDE") adapter that communicates with a disk unit 308, e.g., disk drive.

Automobile computer system 215 may further include a communications adapter 309 coupled to bus 302. Communications adapter 309 interconnects bus 302 with an outside network (e.g., network 216 of FIG. 2) thereby enabling automobile computer system 215 to communicate with other devices (e.g., wireless device 201 of FIG. 2).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, unfortunately, vehicular radar devices are costly to manufacture with tightly-coupled analog circuits and advanced antenna configurations on expensive process technology. Furthermore, radar is spectrally inefficient. In the standard radar processing architecture, for example, with frequency-modulated continuous-wave (FMCW) radar, the resolution is limited by the distance between the received digital samples. As a result, the spectrum bandwidth needs to be 150 MHz for meter-level accuracy. Additionally, current radar has no standardized capacity and/or smart coexistence, which are fundamental to communication systems. Finally, radar is insecure in that emergency braking and adaptive cruise control systems can be disrupted. Hence, current vehicular radar systems are expensive to implement with spectrum inefficiency, lack multiple access, and provide minimal security.

The principles of the present invention provide a means for estimating a distance to target object 102 (FIGS. 1 and 2) from vehicle 100 (FIG. 1) using wireless device 201 (FIG. 2) as a radar device as discussed below in connection with FIGS. 4-9, 10A-10B and 11. In this manner, by operating wireless devices (e.g., IEEE 802.11 devices) as radar devices, a higher accuracy in target range estimates can be achieved with less spectrum bandwidth when compared to standard radar waveforms with standard radar processing. Furthermore, by utilizing wireless devices as opposed to radar devices, the cost problem associated with radar is addressed. Additionally, utilizing a wireless protocol, such as IEEE 802.11, is more secure than utilizing standard radar.

Figure 4:
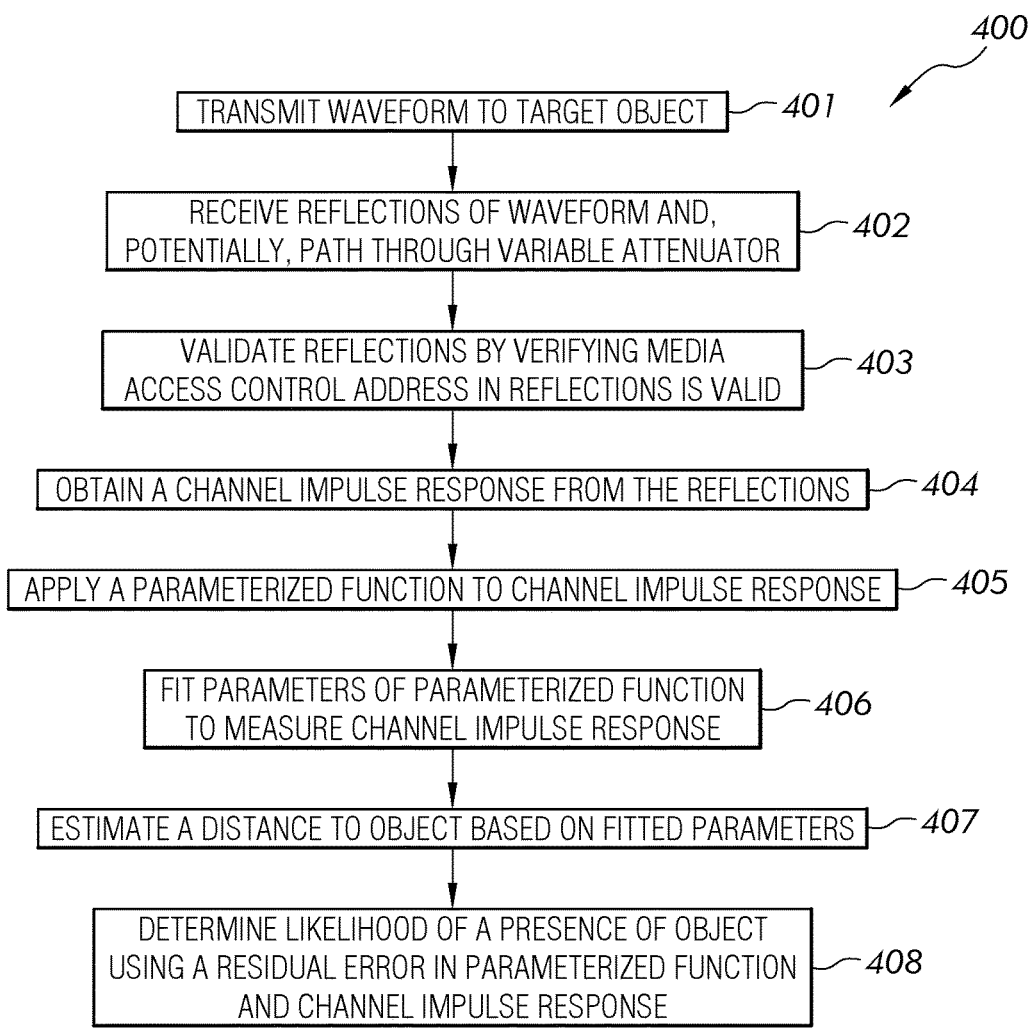
FIG. 4 is a flowchart of a method for estimating distances to targets (e.g., pedestrians, automobiles) utilizing wireless devices (e.g., IEEE 802.11 devices) operating as radio detection and ranging (radar) devices in accordance with an embodiment of the present invention.

Referring now to FIG. 4, FIG. 4 is a flowchart of a method 400 for estimating distances to targets (e.g., pedestrians, automobiles) utilizing wireless devices (e.g., IEEE 802.11 devices) operating as radio detection and ranging (radar) devices in accordance with an embodiment of the present invention.

A brief discussion regarding the steps involved in method 400 will first be provided followed by a detailed discussion regarding using the parameter optimization algorithm on the channel impulse response (e.g., frequency-domain channel impulse response) to estimate the distance from vehicle 100 to target object 102.

Referring to FIG. 4, in conjunction with FIGS. 1-3, in step 401, wireless device 201 (e.g., IEEE 802.11 device) transmits a waveform 204 (e.g., IEEE 802.11 wireless signal) to target object 102, such as via transmit antenna 202. In one embodiment, wireless device 201 may also transmit the internal waveform as discussed above.

In step 402, wireless device 201 receives reflections 205 of the waveform 204, such as via two forward directional antennas 203, and, potentially, the path through variable attenuator 214. That is, wireless device 201 receives reflections 205 of the waveform 204, such as via two forward directional antennas 203, and receives the internal waveform as discussed above.

In step 403, wireless device 201 validates the received reflections 205 by verifying that the media access control address in reflections 205 is valid. In one embodiment, wireless device 201 may also validate the internal waveform by verifying that the media access control address in the internal waveform is valid.

In step 404, automobile computer system 215 obtains a channel impulse response from reflections 205. In one embodiment, automobile computer system 215 receives reflections 205 from wireless device 201 via network 216 thereby obtaining the channel impulse response from such reflections 205. In one embodiment, such a channel impulse response is in the frequency-domain. In another embodiment, such a channel impulse response is in the time-domain. In one embodiment, automobile computer system 215 obtains a channel impulse response from utilizing both reflections 205 and the internal waveform.

In step 405, automobile computer system 215 applies a parameterized function to the channel impulse response. In one embodiment, a parameterized cosine function is applied to the frequency-domain channel impulse response. In another embodiment, a time-domain equivalent of the parameterized cosine function is applied to the time-domain channel impulse response.

In step 406, automobile computer system 215 fits the parameters of the parameterized function to measure the channel impulse response.

In step 407, automobile computer system 215 estimates the distance to target object 102 based on fitted parameters.

In step 408, automobile computer system 215 determines the likelihood of the presence of target object 102 using a residual error in the parameterized function and the channel impulse response.

A demonstration of IEEE 802.11 ranging by using the parameter optimization algorithm on the channel impulse response (e.g., frequency-domain channel impulse response) to determine an estimate of the distance from vehicle 100 to target object 102 is provided below. In particular, IEEE 802.11 ranging is demonstrated by using a two-path parameter optimization algorithm on the channel impulse response (e.g., frequency-domain channel impulse response) estimates, which are already provided by many existing IEEE 802.11 chipsets through an accessible host interface.

In the system model, as discussed herein, a single antenna link is assumed for simplicity in determining the feasibility of IEEE 802.11-based vehicular ranging. Consider the continuous-time complex-baseband link model with time index t, transmitted signal x(t), received signal y(t), wireless channel impulse response h(t) with τ excess delay, and additive noise signal v(t) such that y(t)=h(t)⊗(t)+v(t), where ⊗ is the convolution operator.

Figure 5:
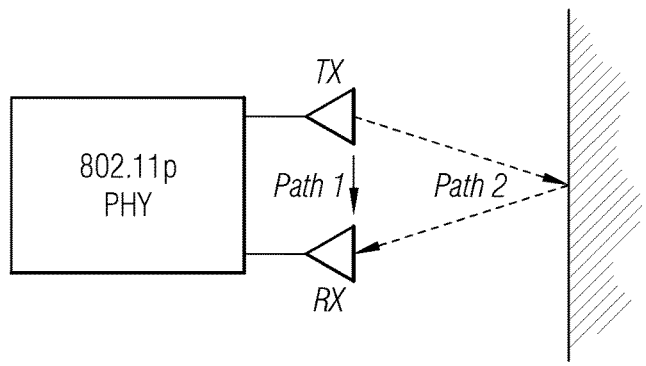
FIG. 5 illustrates the link model in accordance with an embodiment of the present invention.

Structure is added to the system to address the primary vehicular ranging application, forward and reverse collision detection with a primary target (the vehicle directly ahead or behind), by simplifying the general link model. The targeted standard-compliant IEEE 802.11 platform is also aligned. This special case is illustrated in FIG. 5. FIG. 5 illustrates the link model in accordance with an embodiment of the present invention. The assumed hardware platform utilizes separate transmit and receive RF chains.

The channel impulse response can be simplified to reflect a primary target, $$h(t) = \alpha \delta D(t) + \beta \delta D(t-\tau) \quad (1)$$

where δD (·) is the Dirac delta function, τ becomes the time delay associated with target reflection, α is the path loss associated with the direct path (Path 1), and β is the path loss associated with the reflected target (Path 2). α is a function of the transmit power (P), the path loss coefficient of the direct path between the transmit and receive antenna ($L_1$), the signal power feed-through coefficient between the transmit and receive paths in the analog/RF circuit (F), and the gain based on the radiation pattern in the unintended direction of the transmit and receive antennas ($G_1^{(TX)}$ and $G_1^{(RX)}$, respectively) such that $$\alpha = \sqrt{PF} + \sqrt{PG_1^{(TX)}G_1^{(RX)}L_1}. \quad (2)$$

Similarly, β is a function of the transmit power (P), the single-direction path loss coefficient between the transmit antenna and the reflecting object ($L_{2,1}$), the single-direction path loss coefficient between the reflecting object and the receive antenna ($L_{2,2}$), the reflection power loss coefficient (R), and the gain based on the radiation pattern in intended direction of the transmit and receive antennas ($G2^{(TX)}$ and $G2^{(RX)}$, respectively) such that $$\beta = \sqrt{PG_2^{(TX)}G_2^{(RX)}L_{2,1}L_{2,2}R}. \quad (3)$$

The Friis transmission equation determines the path loss coefficients $L_1$, $L_{2,1}$ and $L_{2,2}$. The radar cross section (RCS) equation determines the reflection power loss coefficient R, $$R = \frac{4\pi\sigma}{\lambda^2} \quad (4)$$

where λ is the wavelength and σ is the RCS parameter.

The Fourier transform of (1) is H(f)=α+β exp(-j2πfτ) for frequency f. IEEE 802.11 devices estimate the channel impulse response during the packet decoding process. Current IEEE 802.11 standards utilize orthogonal frequency division multiplexing (OFDM) modulation, hence, OFDM transceivers typically provide frequency domain channel estimates as enabled by the discrete Fourier transform (DFT). Assuming perfect synchronization, perfectly band-limited signals, perfect estimation algorithms, and if τ is smaller than the duration of the OFDM cyclic prefix, the OFDM frequency domain channel estimate of the two-path channel is $$\hat{H}[m] = H(m\Delta) \quad (5)$$

$$= \alpha + \beta e^{-j2\pi m\Delta\tau} \quad (6)$$

where Δ is the subcarrier bandwidth and there are N subcarriers m in {-N/2, -N/2+1, . . . , N/2-1}. Note that practical channel estimates will include noise and various filter contributions. Next, consider the energy of these channel estimates, $$E_{\hat{H}} = \alpha^2 + \beta^2 + 2\alpha\beta \cos(2\pi m\Delta\tau). \quad (7)$$

Finally, the mean-normalized channel energy $\bar{E}_{\hat{H}} = E_{\hat{H}}/\text{mean}(E_{\hat{H}})$, where mean(·) takes the empirical mean over all subcarriers such that $$\bar{E}_{\hat{H}} - 1 \approx \frac{2\beta}{\alpha}\cos(2\pi m\Delta\tau) \quad (8)$$

if it is assumed that α>>β. Hence, one may directly estimate the target range and RCS through parameter optimization of cosine functions to fit the adjusted channel estimate energy.

As discussed below, brute-force optimization of cosine parameters was pursued rather than suboptimal optimization procedures that may reduce algorithm complexity. Brute-force optimization of cosine parameters was pursued for two primary reasons: (1) interested in testing the feasibility of vehicular ranging with the approach of the present invention (feasibility results should not be distorted by suboptimal estimation); and (2) vehicular radar estimates are performed over durations large enough that algorithm complexity is not likely a limiting factor (e.g., 50 ms update interval on Delphi® electronic scanning radars).

The following discusses model error minimization.

The steps taken for range parameter determination from a single frequency domain channel estimate are as follows.

1) Define variables for the iteration k∈N, mean offset (A∈R), the cosine magnitude candidate (B∈R), the initial phase candidate (C∈[0, 2π)), the phase increment (D∈R), the metric value (x∈$R^N$), the metric value estimate ($\hat{x}$∈$R^N$), the target range candidate ρ∈[0, ∞), the minimum residual error $\varepsilon_{min}$∈R, and the target range candidate corresponding to minimum error $\rho_{min}$∈[0, ∞).

2) Define the range of values for A, C, and ρ as $S_A$, $S_C$, and Sρ, respectively, such that A∈$S_A$, C∈$S_C$, and ρ∈Sρ. Define the residual error threshold constant ε$_t$.

3) Initialize x:=$\bar{E}_{\hat{H}}$-1, k:=0, and $\varepsilon_{min}$:=ε$_t$.

4) Use x to determine B. Ideally, B would be set to the maximum magnitude of all dimensions in x to represent the cosine magnitude. In practice, due to noise and model imperfections, some order statistic of the dimensional magnitudes is taken.

5) Set ρ equal to the first value in Sρ.

6) Increment k:=k+1.

7) Use ρ to define the phase increment, D:=4π$f_s$ρ(cN) where c is the speed of light and $f_s$ is the PHY sample rate.

8) Set C equal to the first value in $S_C$.

9) Set A equal to the first value in $S_A$.

10) Use all variables to define the metric value estimate $\hat{x}$: A+B cos(C+D). If $|\hat{x}-x|^2<\varepsilon_{min}$ then $\varepsilon_{min}$:=$|\hat{x}-x|^2$ and $\rho_{min}$:=ρ.

11) Set A equal to the next value in $S_A$ and repeat steps 10 and 11 until all elements in $S_A$ are exhausted.

12) Set C equal to the next value in $S_C$ and repeat steps 9-12 until all elements in $S_C$ are exhausted.

13) Set ρ equal to the next value in Sρ and repeat steps 6-13 until all elements in Sρ are exhausted.

14) If $\varepsilon_{min}<\varepsilon_t$, a target has been determined to be present with target range of $\rho_{min}$.

Ideally, the brute force optimization does not need the offset parameters (A and C). Empirical results, however, have shown that a mean offset often occurs in practice due to limitations of mean ($E_{\hat{H}}$) to estimate $\alpha^2$ in close target conditions and the presence of phase offsets due to the effect of various components in the transceiver processing chain. It should also be noted that as $\alpha$ and $\beta$ approach each other in value, simplifying assumptions also break down. This tends to distort the cosine form in Equation (8).

Figure 6:
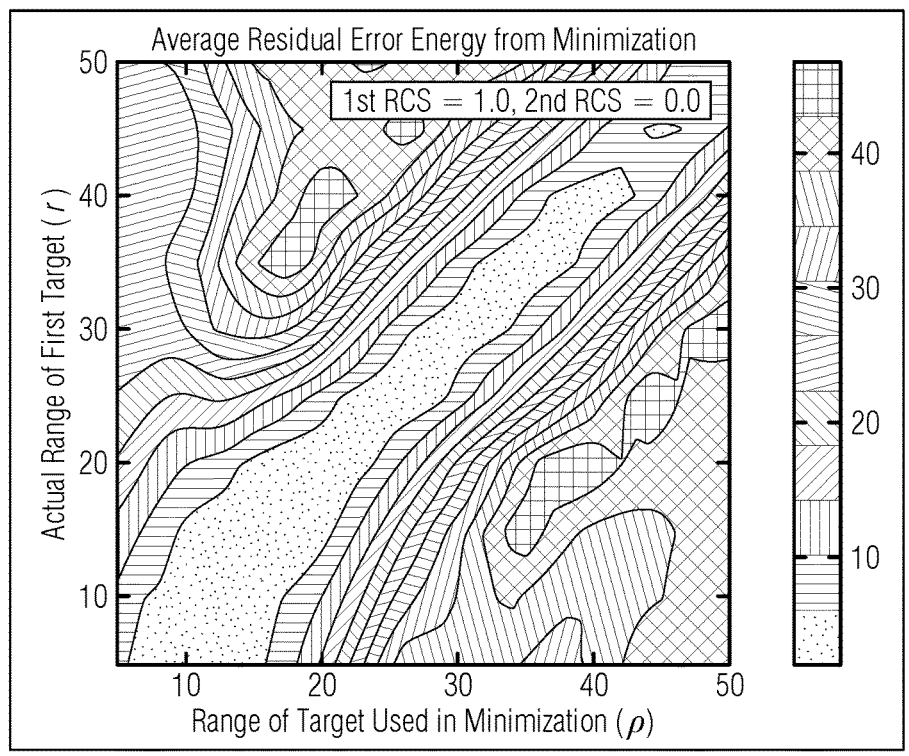
FIG. 6 is a graph illustrating the residual error in the cosine model as a function of the target range and the range parameter ($\rho$) used during the minimization procedure when a single target is present with RCS $\sigma=1.0$ in accordance with an embodiment of the present invention.
Figure 7:
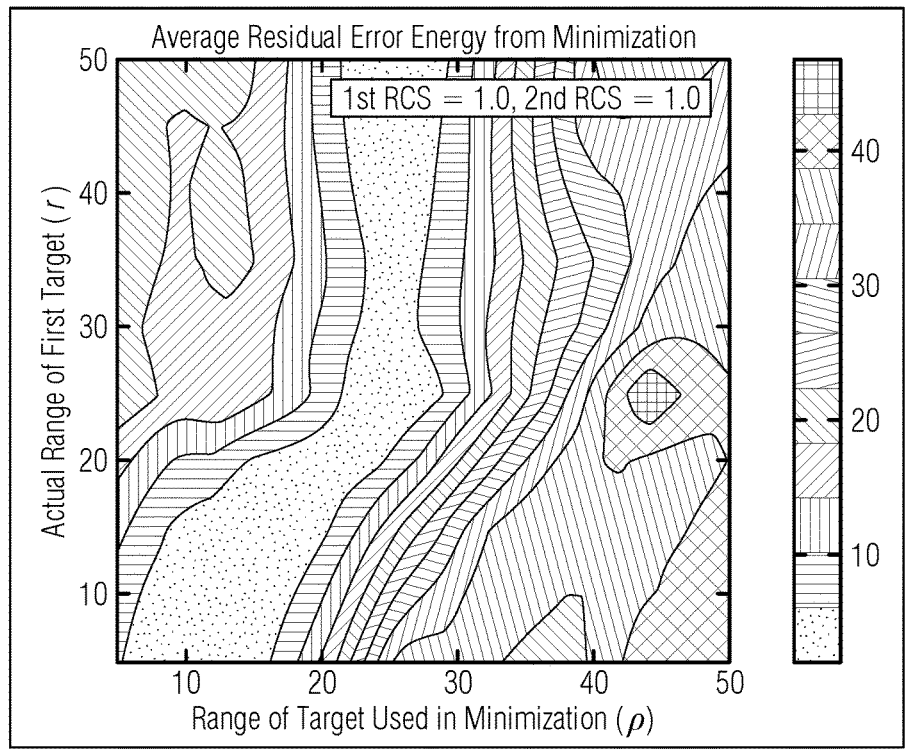
FIG. 7 is a graph illustrating the residual error in the cosine model as a function of the first target range and the range parameter ($\rho$) used during the minimization procedure when two targets are present, both with RCS $\sigma=1.0$ in accordance with an embodiment of the present invention.

The proposed algorithm of the present invention is valid in multiple target environments, under the constraint that one target (the desired target) is stronger than the other targets. For example, consider FIG. 6, which illustrates the residual error in the cosine model from Equation (8) as a function of target range and the range parameter ($\rho$) used during the minimization procedure when a single target is present with RCS $\sigma=1.0$ in accordance with an embodiment of the present invention. As illustrated in FIG. 6, FIG. 6 illustrates the mean residual error for an IEEE 802.11 target detection at 5.89 GHz with a single target with RCS $\rho=1$ as a function of the actual target range and the range parameter used for brute-force minimization. Next, consider FIG. 7, which illustrates the residual error in the cosine model from Equation (8) as a function of the first target range and the range parameter ($\rho$) used during the minimization procedure when two targets are present, both with RCS $\rho=1.0$ in accordance with an embodiment of the present invention. As illustrated in FIG. 7, this plot shows that the minimization algorithm of the present invention now additionally has a low residual error for target ranges at 25 m where the second target is fixed when the first target has a range substantially larger than 25 m. The effect is that the proposed target detection and ranging algorithm will focus on the stronger target.

The discussion below focuses on quantifying the performance of IEEE 802.11 ranging through the proposed minimization procedure. A summary of the parameters of the simulations are listed in Table I of FIG. 8. FIG. 8 is a table, Table 1, of the simulation parameters to test the ranging feasibility in accordance with an embodiment of the present invention.

The sample rates of the PHY and the channel model are, while both oversampled, at different rates due to variable fidelity requirements. 4× oversampling in the PHY is required to both faithfully represent the spectral mask and allow for low-complexity OFDM transceiver processing with 256-point (I)FFTs. 100× oversampling in the channel model is required to represent the reflections with high fidelity. 25:1 interpolation and 1:25 decimation filters are used after the transmitter and before the receiver, respectively, to interface the channel model with the PHY.

Figure 9:
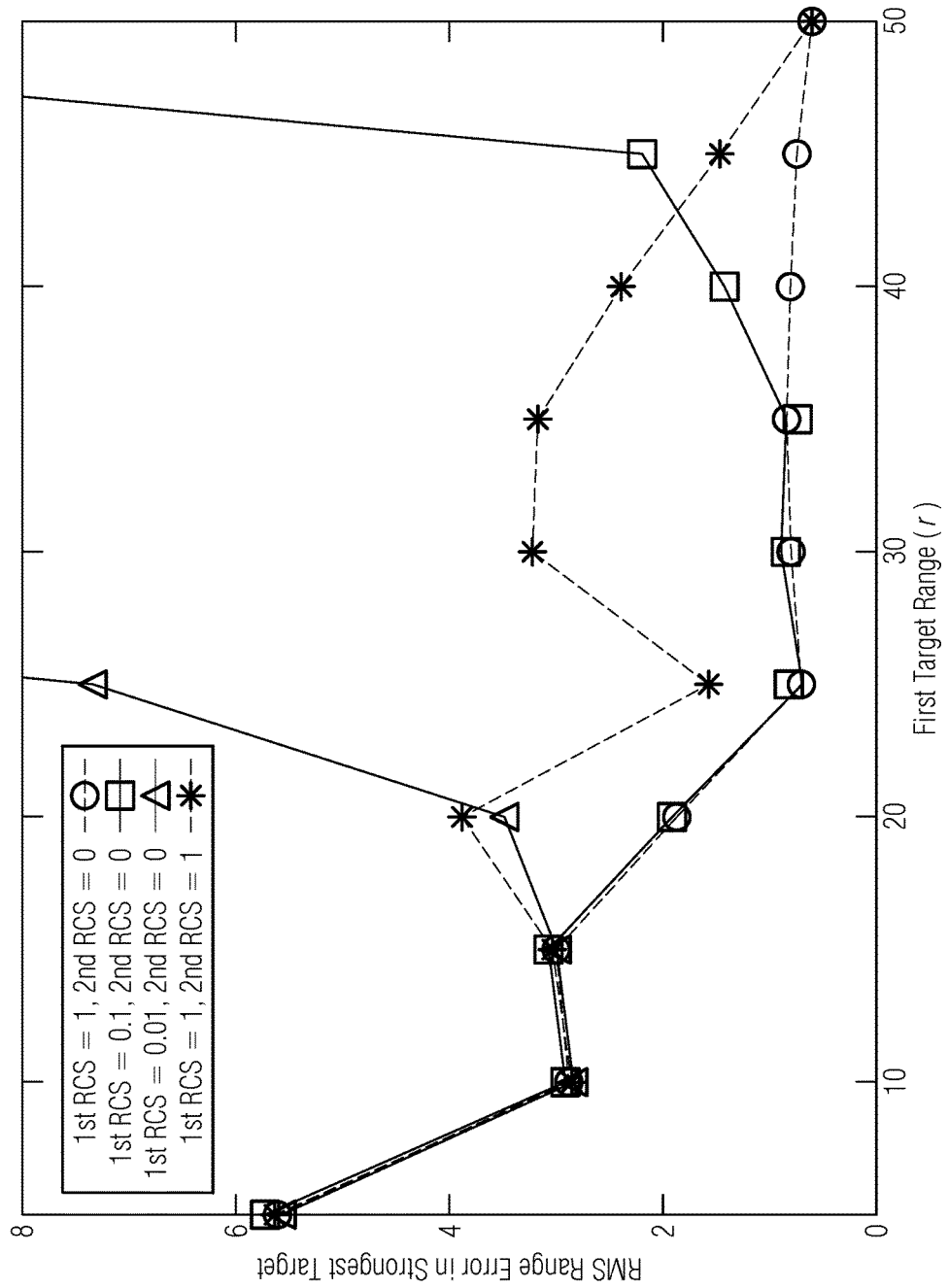
FIG. 9 is a graph illustrating the RMS range error when the minimization procedure is used on the IEEE 802.11 packets in a 10 MHz channel with two targets and variable RCS values in accordance with an embodiment of the present invention.

FIG. 9 illustrates the RMS range error when the minimization procedure is used on IEEE 802.11 packets in a 10 MHz channel with two targets and variable RCS values in accordance with an embodiment of the present invention. In one embodiment, the first target has variable range (5-50 m) and the second target is fixed (25 m).

As illustrated in FIG. 9, FIG. 9 illustrates the RMS error of the range estimate (compared to the larger energy target) with IEEE 802.11p and 10 MHz spectral bandwidth using the procedure discussed above as a function of target range, for various target RCS values. In the first three plot lines on FIG. 9, only one RCS value is included (2nd target $\sigma=0$). The last plot line reflects two targets with RCS $\sigma=1$: the first with variable range and the second target with fixed range at 25 m. FIG. 9 shows that strong targets ($\sigma=1.0$), in the absence of other targets, can be accurately estimated at distances greater than 15 m. Below 15 m, the cosine term in Equation (8) does not complete one full cycle. Consequently, mean offsets are magnified, resulting in occasionally poor estimates. For weaker targets ($\sigma \leq 0.1$), range estimates cannot occur accurately at 50 m, and are unreliable outside different range boundaries (45 m for $\sigma=0.1$ and 35 m for $\sigma=0.01$). Fortunately most vehicular targets are at least $\sigma=1.0$. With two targets, performance is slightly degraded, especially when the two targets have similar, but unequal strength (first target range near 25 m).

FIG. 9 does not consider detection probability, $p_d$, the probability of false alarm, $p_{fa}$, or the residual error threshold, $\varepsilon_t$. To determine the best $\varepsilon_t$, the probability of false alarm, or the probability of detection when no target is present, is considered. If one assumes that ranging estimates will be provided every 50 ms and that the expected number of false detections<1/hour is required, then this implies $p_{fa}$ is at worst $1 \times 10^{-5}$. Extrapolating from FIGS. 10A and 10B (discussed below), $\varepsilon_t$ is required to be≤25.

Figure 10B:
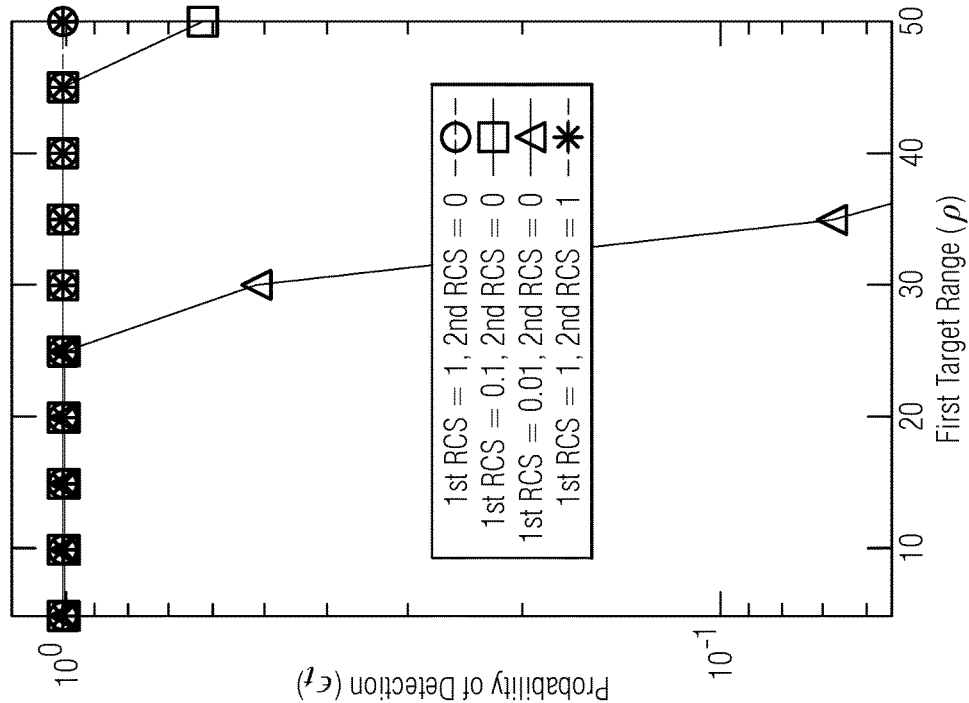
FIGS. 10A-10B are graphs that illustrate the probability of detection and probability of false alarms, respectively, when the minimization procedure is used on IEEE 802.11 packets in a 20 MHz channel with two targets and variable RCS values in accordance with an embodiment of the present invention.
Figure 10A:
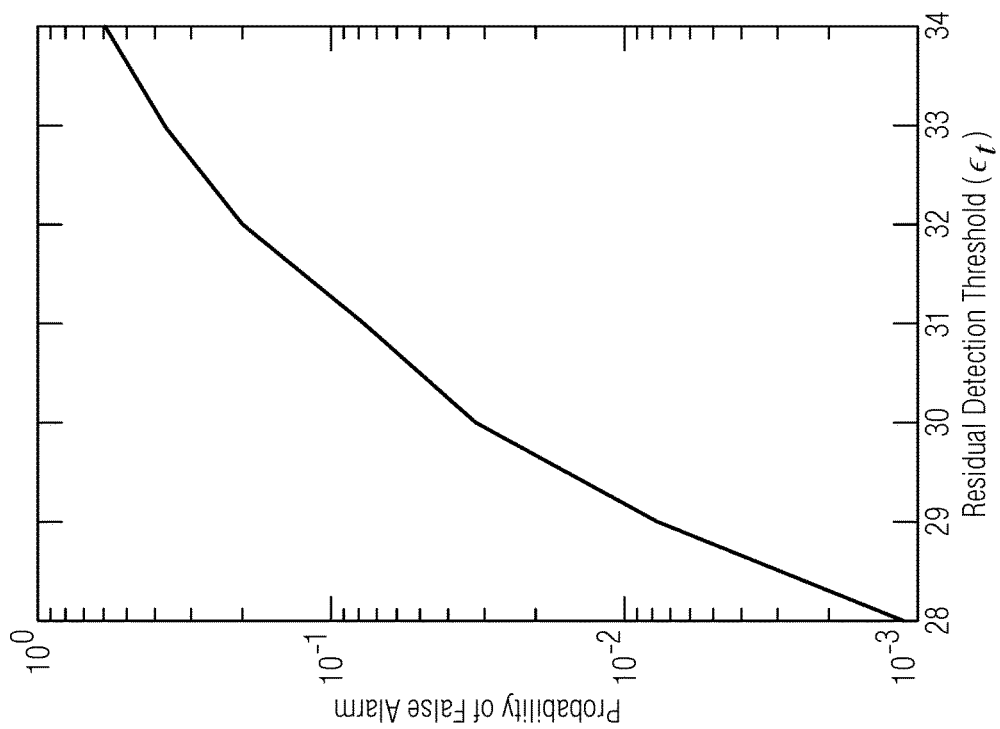

FIGS. 10A and 10B are graphs that illustrate the probability of detection and the probability of false alarms when the minimization procedure of the present invention is used on IEEE 802.11 packets in a 20 MHz channel with two targets and variable RCS values in accordance with an embodiment of the present invention. In one embodiment, the first target has the variable range (5-50 m) and the second target is fixed (25 m).

In FIGS. 10A and 10B, $\rho_d$ is plotted in FIGS. 10A and 10B with $\varepsilon_t=25$. It is noted that, as the target range increases and the target RCS decreases, $\rho_d$ does as well. It is also noted that there is a region where $\rho_d$ is reliable, but the range estimate is not. This suggests that a more conservative $\varepsilon_t$ might be desirable to prevent target detection when range estimates are inaccurate. In the presence of two targets, detection probability is unwavered, despite the loss in range precision. This further motivates a more conservative value for $\varepsilon_t$.

Figure 11:
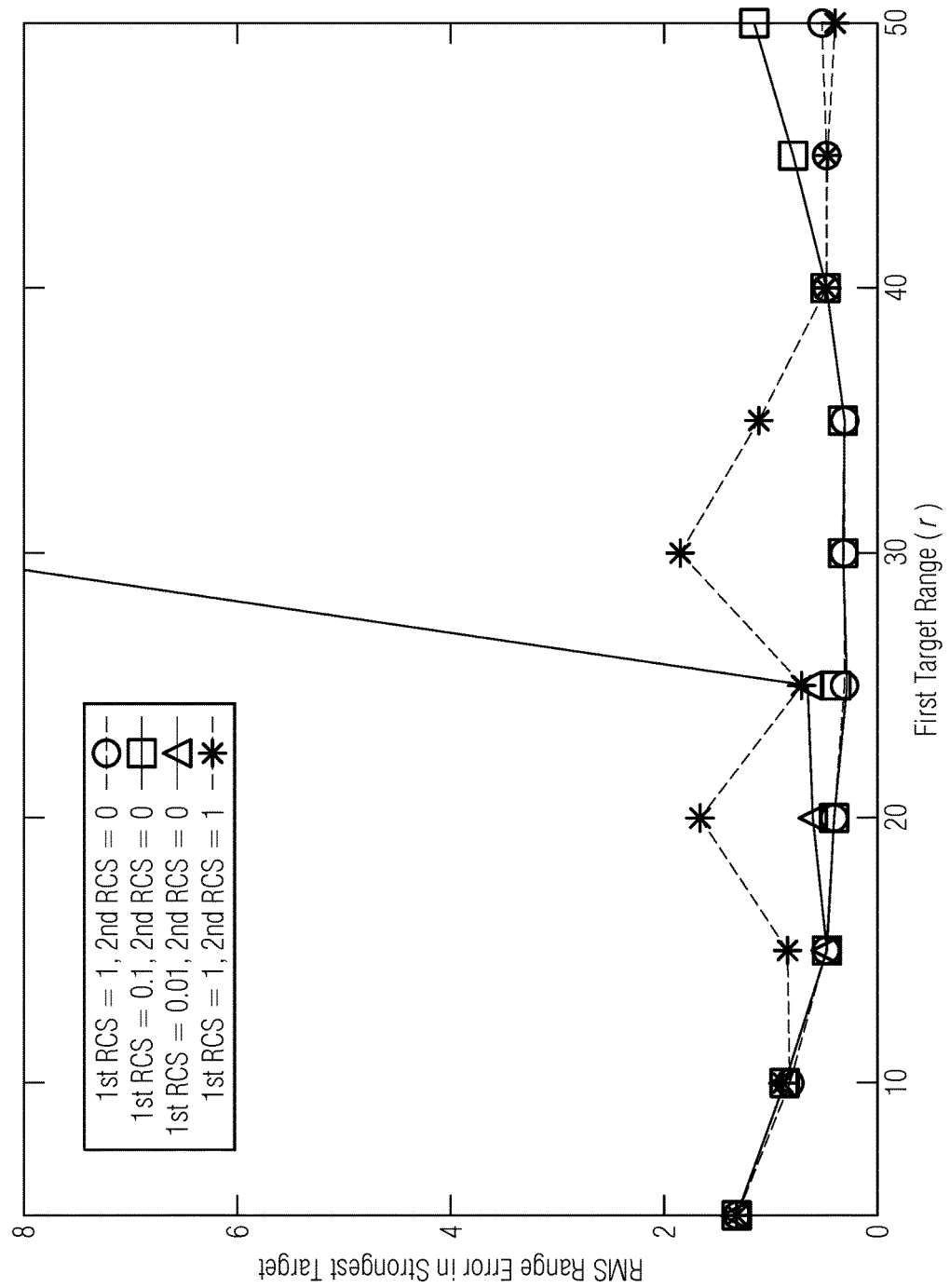
FIG. 11 is a graph illustrating the RMS range error when the minimization procedure is used on IEEE 802.11 packets in a 20 MHz channel with two targets and variable RCS values in accordance with an embodiment of the present invention.

While the accuracy of ranging with 10 MHz IEEE 802.11p packets is much better than suggested from traditional radar signal processing, the performance shown in FIG. 9 is not meter-level accurate. Consequently, the target scenarios are also simulated from FIG. 9, but instead with 20 MHz IEEE 802.11a channels. These results are found in FIG. 11 (probability of detection and false alarm did not change significantly). FIG. 11 illustrates the RMS range error when the minimization procedure of the present invention is used on IEEE 802.11 packets in a 20 MHz channel with two targets and variable RCS values in accordance with an embodiment of the present invention. In one embodiment, the first target has the variable range (5-50 m) and the second target is fixed (25 m).

Hence, the feasibility of ranging in IEEE 802.11 packets with minimal modification to current devices is demonstrated. To achieve feasibility, structure in the vehicular radar channel was exploited for a single target and parameter optimization was employed on frequency domain channel estimates. Meter-level precision was achieved with only 20 MHz of bandwidth, in contrast to first principles of generic radar processing which suggests a minimum of 150 MHz. The results discussed herein have significant consequences for intelligent transportation to reduce cost and increase proliferation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for computing a target distance estimate using a wireless device, the method comprising:
   transmitting a waveform to an object by a wireless device, wherein said waveform is a wireless communication signal;
   receiving reflections of said waveform;
   obtaining a channel impulse response from said reflections;
   applying, by a processor, a parameterized function to said channel impulse response;
   fitting parameters of said parameterized function, by said processor, to measure said channel impulse response;
   estimating, by said processor, a distance to said object based on said fitted parameters; and
   determining a likelihood of a presence of said object using a residual error in said parameterized function and said channel impulse response.

2. The method as recited in claim 1 further comprising:
   obtaining said channel impulse response from said reflections and an internal waveform that is transmitted and received by transmit and receive circuits, respectively.

3. The method as recited in claim 1, wherein said channel impulse response corresponds to a frequency-domain channel impulse response or a time-domain channel impulse response.

4. The method as recited in claim 1, wherein said parameterized function comprises a parameterized cosine function.

5. The method as recited in claim 1 further comprising:
   validating said reflections of said waveform by verifying that a media access control address in said reflections is valid.

6. The method as recited in claim 1, wherein a resolution of said reflections of said waveform is controlled via an attenuator directly or indirectly connected to transmit and receive antenna ports.

7. The method as recited in claim 1, wherein said wireless device is an IEEE 802.11 device.

8. The method as recited in claim 1, wherein said estimated distance is used for object collision detection and/or adaptive cruise control.

9. The method as recited in claim 1, wherein said wireless communication signal is a wireless IEEE 802.11 wireless signal.

10. The method as recited in claim 1, wherein said object is a pedestrian or an automobile.

11. A computer program product for computing a target distance estimate using a wireless device, the computer program product comprising a computer readable storage medium having program code embodied therewith, the program code comprising the programming instructions for:
    obtaining a channel impulse response from reflections of a waveform transmitted to an object by a wireless device, wherein said waveform is a wireless communication signal;
    applying a parameterized function to said channel impulse response;
    fitting parameters of said parameterized function to measure said channel impulse response;
    estimating a distance to said object based on said fitted parameters; and
    determining a likelihood of a presence of said object using a residual error in said parameterized function and said channel impulse response.

12. The computer program product as recited in claim 11, wherein the program code further comprises the programming instructions for:
    obtaining said channel impulse response from said reflections and an internal waveform that is transmitted and received by transmit and receive circuits, respectively.

13. The computer program product as recited in claim 11, wherein said channel impulse response corresponds to a frequency-domain channel impulse response or a time-domain channel impulse response.

14. The computer program product as recited in claim 11, wherein said parameterized function comprises a parameterized cosine function.

15. The computer program product as recited in claim 11, wherein the program code further comprises the programming instructions for:
    validating said reflections of said waveform by verifying that a media access control address in said reflections is valid.

16. The computer program product as recited in claim 11, wherein a resolution of said reflections of said waveform is controlled via an attenuator directly or indirectly connected to transmit and receive antenna ports.

17. The computer program product as recited in claim 11, wherein said wireless device is an IEEE 802.11 device.

18. The computer program product as recited in claim 11, wherein said estimated distance is used for object collision detection and/or adaptive cruise control.

19. The computer program product as recited in claim 11, wherein said wireless communication signal is a wireless IEEE 802.11 wireless signal.

20. The computer program product as recited in claim 11, wherein said object is a pedestrian or an automobile.

21. A wireless device, comprising:
    a memory unit for storing a computer program for computing a target distance estimate; and
    a processor coupled to the memory unit, wherein the processor is configured to execute the program instructions of the computer program comprising:
       obtaining a channel impulse response from reflections of a waveform transmitted to an object by a wireless device, wherein said waveform is a wireless communication signal;
       applying a parameterized function to said channel impulse response;
       fitting parameters of said parameterized function to measure said channel impulse response;
       estimating a distance to said object based on said fitted parameters; and
       determining a likelihood of a presence of said object using a residual error in said parameterized function and said channel impulse response.

22. The wireless device as recited in claim 21, wherein the program instructions of the computer program further comprise:
    obtaining said channel impulse response from said reflections and an internal waveform that is transmitted and received by transmit and receive circuits, respectively.

23. The wireless device as recited in claim 21, wherein said channel impulse response corresponds to a frequency-domain channel impulse response or a time-domain channel impulse response.

24. The wireless device as recited in claim 21, wherein said parameterized function comprises a parameterized cosine function.

25. The wireless device as recited in claim 21, wherein the program instructions of the computer program further comprise:
   validating said reflections of said waveform by verifying that a media access control address in said reflections is valid.

26. The wireless device as recited in claim 21, wherein a resolution of said reflections of said waveform is controlled via an attenuator directly or indirectly connected to transmit and receive antenna ports.

27. The wireless device as recited in claim 21, wherein said wireless device is an IEEE 802.11 device.

28. The wireless device as recited in claim 21, wherein said estimated distance is used for object collision detection and/or adaptive cruise control.

29. The wireless device as recited in claim 21, wherein said wireless communication signal is a wireless IEEE 802.11 wireless signal.

30. The wireless device as recited in claim 21, wherein said object is a pedestrian or an automobile.

* * * * *